US008107882B2

(12) United States Patent  (10) Patent No.: US 8,107,882 B2
Fischer et al.  (45) Date of Patent: Jan. 31, 2012

(54) INTELLIGENT DOWNSTREAM TRAFFIC DELIVERY TO MULTI-PROTOCOL STATIONS

(75) Inventors: Michael Andrew Fischer, San Antonio, TX (US); Timothy Gordon Godfrey, Overland Park, KS (US)

(73) Assignee: Intellectual Ventures I LLC, Wilmington, DE (US)

( * ) Notice: Subject to any disclaimer, the term of this patent is extended or adjusted under 35 U.S.C. 154(b) by 1634 days.

(21) Appl. No.: 10/861,065

(22) Filed: Jun. 4, 2004

(65) Prior Publication Data

US 2005/0026637 A1  Feb. 3, 2005

Related U.S. Application Data

(60) Provisional application No. 60/491,213, filed on Jul. 30, 2003.

(51) Int. Cl.
*H04B 1/00* (2006.01)
*H04B 15/00* (2006.01)

(52) U.S. Cl. .................. 455/63.1; 455/41.2; 455/509

(58) Field of Classification Search .................. 455/502, 455/552.1, 553.1, 63.1, 67.11, 41.2, 509 455/512
See application file for complete search history.

(56) References Cited

U.S. PATENT DOCUMENTS

| | | | |
|---|---|---|---|
| 5,077,732 A | 12/1991 | Fischer et al. | |
| 5,392,300 A | 2/1995 | Borth et al. | |
| 5,546,444 A | 8/1996 | Roach et al. | |
| 6,172,980 B1 | 1/2001 | Flanders et al. | |
| 6,469,620 B1 | 10/2002 | Reisinger | |
| 6,473,419 B1 | 10/2002 | Gray et al. | |
| 6,477,156 B1 | 11/2002 | Ala-Laurila et al. | |
| 6,490,292 B1 | 12/2002 | Matsuzawa | |
| 6,882,851 B2 * | 4/2005 | Sugar et al. | 455/454 |
| 6,954,616 B2 * | 10/2005 | Liang et al. | 455/63.1 |
| 6,996,415 B2 | 2/2006 | Lee et al. | |
| 7,046,649 B2 | 5/2006 | Awater et al. | |
| 7,072,616 B2 * | 7/2006 | Godfrey | 455/41.2 |
| 7,079,812 B2 * | 7/2006 | Miller et al. | 455/63.1 |
| 7,143,320 B2 * | 11/2006 | Cavin | 714/704 |
| 7,310,688 B1 | 12/2007 | Chin | |
| 7,346,026 B2 | 3/2008 | Sherman et al. | |
| 7,372,855 B2 | 5/2008 | Kandala | |
| 7,460,501 B2 | 12/2008 | Sherman | |
| 7,471,667 B2 | 12/2008 | Hirsch et al. | |
| 2001/0040895 A1 | 11/2001 | Templin | |
| 2002/0181426 A1 | 12/2002 | Sherman | |
| 2003/0133469 A1 * | 7/2003 | Brockmann et al. | 370/445 |
| 2003/0214905 A1 | 11/2003 | Solomon et al. | |
| 2004/0057439 A1 | 3/2004 | Ould-Brahim | |
| 2004/0083293 A1 | 4/2004 | Chen et al. | |
| 2004/0136339 A1 | 7/2004 | Wentink | |
| 2005/0025173 A1 | 2/2005 | Fischer et al. | |
| 2005/0215197 A1 * | 9/2005 | Chen et al. | 455/41.2 |
| 2005/0239474 A9 * | 10/2005 | Liang | 455/454 |

OTHER PUBLICATIONS

International Preliminary Report on Patentability for PCT/US2004/024017, issued Jan. 30, 2006.
International Search Report for PCT/US2004/024017, mailed Jan. 17, 2005.

* cited by examiner

*Primary Examiner* — Ping Hsieh

(57) ABSTRACT

A technique is disclosed for improving how stations that operate in accordance with different protocols coexist with an access point that operates in accordance with a single protocol. In the illustrative embodiment of the present invention, a station provides timing information to an IEEE 802.11 access point. The access point uses the timing information to determine when it may transmit any available frames to the station, so as not to interfere with any ongoing Bluetooth packet transmissions that are made by the station.

29 Claims, 8 Drawing Sheets

Figure 5

| Bits | 2 | 10 | 4 | 32 |
|---|---|---|---|---|
| Purpose | Type | Timing Synchronization Function | Offset | Other |

500

INTELLIGENT DOWNSTREAM TRAFFIC DELIVERY TO MULTI-PROTOCOL STATIONS

CROSS-REFERENCE TO RELATED APPLICATIONS

This application claims the benefit of:
1. U.S. Provisional Application Ser. No. 60/491,213, filed Jul. 30, 2003, entitled "Intelligent Downstream Traffic Delivery to Multi-Protocol Stations,"
which is also incorporated by reference.
The following patent application is incorporated by reference:
1. U.S. application Ser. No. 10/830570, filed Apr. 23, 2004, entitled "Signaling Extended Functionality and Management Information in a Network,".

FIELD OF THE INVENTION

The present invention relates to telecommunications in general, and, more particularly, to local area networks (LAN).

BACKGROUND OF THE INVENTION

FIG. 1 depicts a schematic diagram of wireless local-area network (LAN) 100 in the prior art comprising access point 101, stations 102-1 through 102-K, wherein K is a positive integer, and shared-communications channel 103. Stations 102-1 through 102-K are typically associated with host computers (not shown), such as notebook computers, personal digital assistants (PDA), tablet PCs, etc. Stations 102-1 through 102-K enable communications (i) between the host computers or (ii) between the host computers and other devices, such as printer servers, email servers, file servers, etc. Access point 101 enables stations 102-1 through 102-K to (i) coordinate transmissions between each other and (ii) communicate with devices in other communications networks.

Access point 101 and stations 102-k, for k=1 through K, transmit data blocks called "frames" over shared-communications channel 103. If two or more stations (or access point 101 and a station) transmit frames simultaneously, then one or more frames can become corrupted, resulting in what is called a "collision". Local-area networks, therefore, typically employ a medium access control (MAC) protocol for ensuring that a station can gain exclusive access to shared-communications channel 103 for an interval of time in order to transmit one or more frames. A "protocol" is a set of communications procedures that relate to the format and timing of transmissions between different stations.

In wireless local-area networks that are based on the Institute of Electrical and Electronics Engineers (IEEE) 802.11 standard, the medium access control protocol is based on a mechanism called "carrier sense multiple access" (CSMA), in which station 102-k or access point 101 can detect whether shared-communications channel 103 is busy or idle. If shared-communications channel 103 is busy, station 102-k or access point 101 will wait until the channel is idle before attempting to transmit a signal that conveys a message.

Shared-communications channel 103 can be used by stations that operate in accordance with different protocols. For example, the IEEE 802.11 standard (e.g., 802.11a, 802.11b, 802.11e, 802.11g, etc.) describes one set of protocols, and the Bluetooth standard describes another set of protocols. A particular station (e.g., station 102-1, etc.) might handle an IEEE 802.11 protocol or a Bluetooth protocol, or both. A station that is capable of handling multiple protocols (i.e., a "multi-protocol station") comprises multiple protocol subsystems, or "parts", in which each part handles communications in accordance with a specific protocol.

Coordination of the IEEE 802.11 and Bluetooth protocols in a multi-protocol station can become particularly difficult when the Bluetooth part transmits or receives data blocks (i.e., "packets") that are synchronous connection oriented (SCO) (e.g., voice packets, etc.), because such packets are often repeatedly transmitted at high data rates. As a result, Bluetooth coexistence mechanisms, such as the IEEE 802.15.2 set of standards, have been introduced in the prior art to address this problem. Such coexistence mechanisms coordinate a multi-protocol station's transmission of (i) Bluetooth synchronous connection oriented voice packets, and (ii) frames of another protocol. These mechanisms, however, do not prevent collisions that can occur when access point 101 transmits an IEEE 802.11 frame at the same time that a multi-protocol station transmits a Bluetooth packet.

Another approach in the prior art is to use the IEEE 802.11 Power Save state to cause access point 101 to queue outbound IEEE 802.11 traffic that is intended for station 102-k. The queuing occurs during the time that station 102-k indicates that it is inactive in the IEEE 802.11 sense as far as access point 101 is aware, but actually remains active in the Bluetooth sense. The technique of entering and exiting power save mode to allow time for Bluetooth operation, however, does not effectively support synchronous connection oriented operation of Bluetooth for some applications (e.g., voice, etc.). The repetition rate of synchronous connection oriented Bluetooth is so rapid that it is often impractical to rely on the IEEE 802.11 frames that indicate the rapid changes in power save state.

Therefore, a need exists for an improvement in how stations that operate in accordance with different protocols coexist with an access point without some of the costs and disadvantages in the prior art.

SUMMARY OF THE INVENTION

The present invention provides a technique for improving how stations that operate in accordance with different protocols over the same shared-communications channel coexist with an access point, without some of the costs and disadvantages in the prior art. In the illustrative embodiment of the present invention, a station that supports multiple protocols transmits timing information to an IEEE 802.11 access point. The timing information indicates when the station will be transmitting one or more packets using the Bluetooth protocol. The access point uses the timing information to determine when it may transmit any available IEEE 802.11 frames to the station, so as not to interfere with the ongoing Bluetooth packet transmissions.

Transmitting timing information to the access point is important because normally, the access point, capable of understanding only IEEE 802.11 frames, has no knowledge of the Bluetooth operation and timing of repetitive Bluetooth packets at a multi-protocol station. By using the timing information, the access point refrains from transmitting to the multi-protocol station during the station's Bluetooth packet transmissions. Furthermore, the access point transmits to the multi-protocol station only when it is safe to do so. This has the two-fold effect of (i) avoiding additional interference and (ii) transmitting via a particular protocol only when the multi-protocol station is able to listen to that protocol.

The illustrative embodiment is described in the context of Bluetooth and IEEE 802.11.However, it will be clear to those skilled in the art, after reading this specification, how to apply the illustrative embodiment of the present invention to other separate protocols.

An illustrative embodiment of the present invention comprises: receiving timing information via a shared-communications channel from a first telecommunications station in accordance with a first protocol, wherein the timing information is based on the transmit times of at least one transmission in a series of transmissions by the first telecommunications station into the shared-communications channel in accordance with a second protocol; and refraining from transmitting to the first telecommunications station during each transmission of the series of transmissions, wherein the refraining is based on the timing information.

BRIEF DESCRIPTION OF THE DRAWINGS

FIG. 5 depicts the components of information group 500.

DETAILED DESCRIPTION

Figure 1:
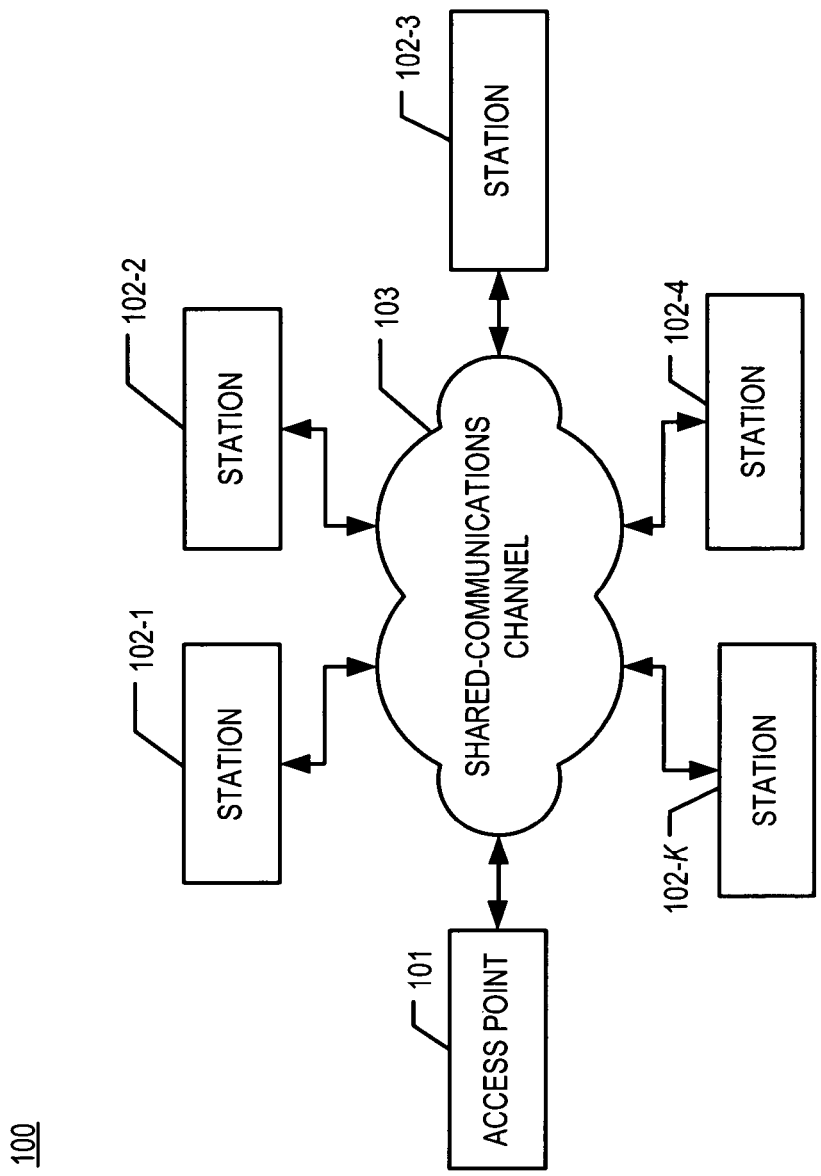
FIG. 1 depicts a schematic diagram of wireless local area network 100 in the prior art.
Figure 2:
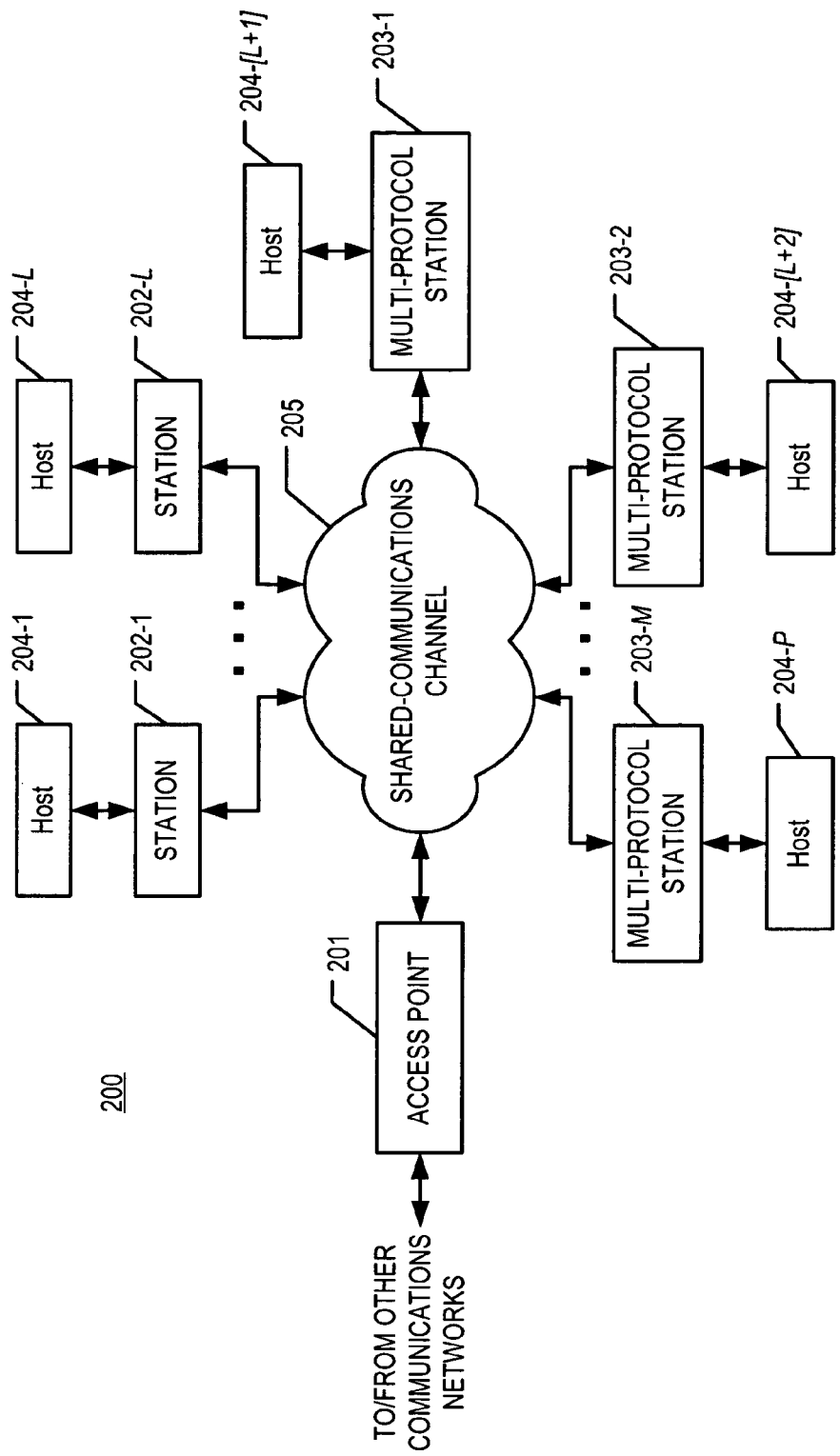
FIG. 2 depicts a schematic diagram of a portion of network 200 in accordance with the illustrative embodiment of the present invention.

FIG. 2 depicts a schematic diagram of network 200 in accordance with the illustrative embodiment of the present invention. Network 200 comprises access point 201; stations 202-1 through 202-L, wherein L is a positive integer; multi-protocol stations 203-1 through 203-M, wherein M is a positive integer; host computers 204-1 through 202-P, wherein P is a positive integer equal to L plus M; and wireless shared-communications channel 205, interconnected as shown. In some embodiments, network 200 is a wireless local area network.

Access point 201, stations 202-1 through 202-L, and multi-protocol stations 203-1 through 203-M operate in accordance with an IEEE 802.11 standard. Multi-protocol stations 203-1 through 203-M also operate in accordance with the Bluetooth standard.

It will be clear to those skilled in the art, after reading this specification, how to make and use embodiments of the present invention that operate in accordance with other protocols. Furthermore, it will be clear to those skilled in the art, after reading this specification, how to make and use embodiments of the present invention that use a wireline or tangible shared-communications channel.

Access point 201 enables stations 202-1 through 202-L and multi-protocol stations 203-1 through 203-M within network 200 to communicate with devices in other communications networks. Furthermore, because access point 201 coordinates communication over shared-communications channel 205, stations 202-1 through 202-L and multi-protocol stations 203-1 through 203-M communicate with each other through access point 201. The salient details of access point 201 are described below and with respect to FIG. 3.

Stations within network 200, in other embodiments, communicate directly with each other and without access point 201. It will be clear to those skilled in the art how to make and use stations that communicate with each other without access point 201.

Station 202-$i$, for $i=1$ through L, comprises a radio (i.e., a transmitter/receiver subsystem) that enables host computer 204-$i$ to communicate via shared-communications channel 205 by using a single protocol only (i.e., IEEE 802.11 or Bluetooth, but not both). Station 202-$i$ is capable of receiving data blocks from host computer 204-$i$ and transmitting over shared-communications channel 205 messages (e.g., frames, packets, etc.) that comprise the data received from host computer 204-$i$. Station 202-$i$ is also capable of receiving messages from shared-communications channel 205 and sending to host computer 204-$i$ data blocks that comprise data from the messages. It will be clear to those skilled in the art how to make and use station 202-$i$.

Multi-protocol station 203-$i$, for $i=1$ through M, comprises the radios that enable host computer 204-$(i+L)$ to communicate via shared-communications channel 205. Multi-protocol station 203-$i$ is capable of receiving data blocks from host computer 204-$(i+L)$ and transmitting over shared-communications channel 205 data messages comprising the data received from host computer 204-$(i+L)$. Multi-protocol station 203-$i$ is also capable of receiving data messages from shared-communications channel 205 and sending to host computer 204-$(i+L)$ data blocks comprising data from the data messages. It will be clear to those skilled in the art, after reading this specification, how to make and use multi-protocol station 203-$i$. The salient details for multi-protocol station 203-$i$ are described below and with respect to FIG. 4.

Host computer 204-$i$, for $i=1$ to P, is capable of generating data blocks and transmitting those data blocks to station 202-$i$ or multi-protocol station 203-$j$, wherein j is equal to (i–L). Host computer 204-$i$ is also capable of receiving data blocks from station 202-$i$ or multi-protocol station 203-$j$ and of processing and using the data contained within those data blocks. Host computer 204-$i$ can be, for example, a desktop or a laptop computer that uses network 200 to communicate with other hosts and devices via access point 201. It will be clear to those skilled in the art how to make and use host computer 204-$i$.

Figure 3:
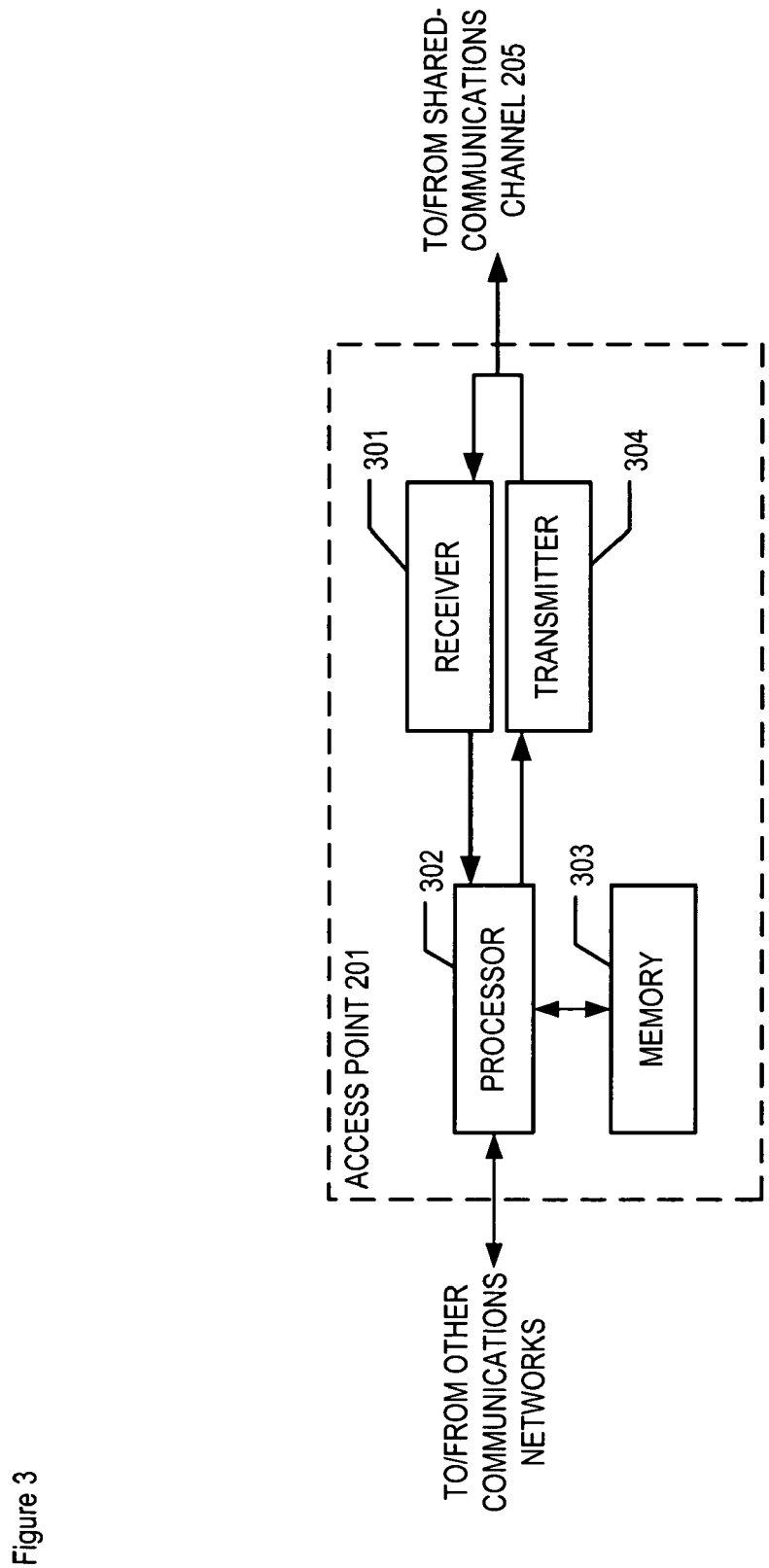
FIG. 3 depicts a block diagram of the salient components of access point 201 in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown.

Receiver 301 is a circuit that is capable of receiving messages from shared-communications channel 205, in well-known fashion, and of forwarding them to processor 302. It will be clear to those skilled in the art how to make and use receiver 301.

Processor 302 is a general-purpose processor that is capable of performing the tasks described below and with respect to FIGS. 5, 7, and 8. It will be clear to those skilled in the art, after reading this specification, how to make and use processor 302.

Memory 303 is capable of storing programs and data used by processor 302. It will be clear to those skilled in the art how to make and use memory 303.

Transmitter 304 is a circuit that is capable of receiving messages from processor 302, in well-known fashion, and of transmitting them on shared-communications channel 205. It will be clear to those skilled in the art how to make and use transmitter 304.

Figure 4:
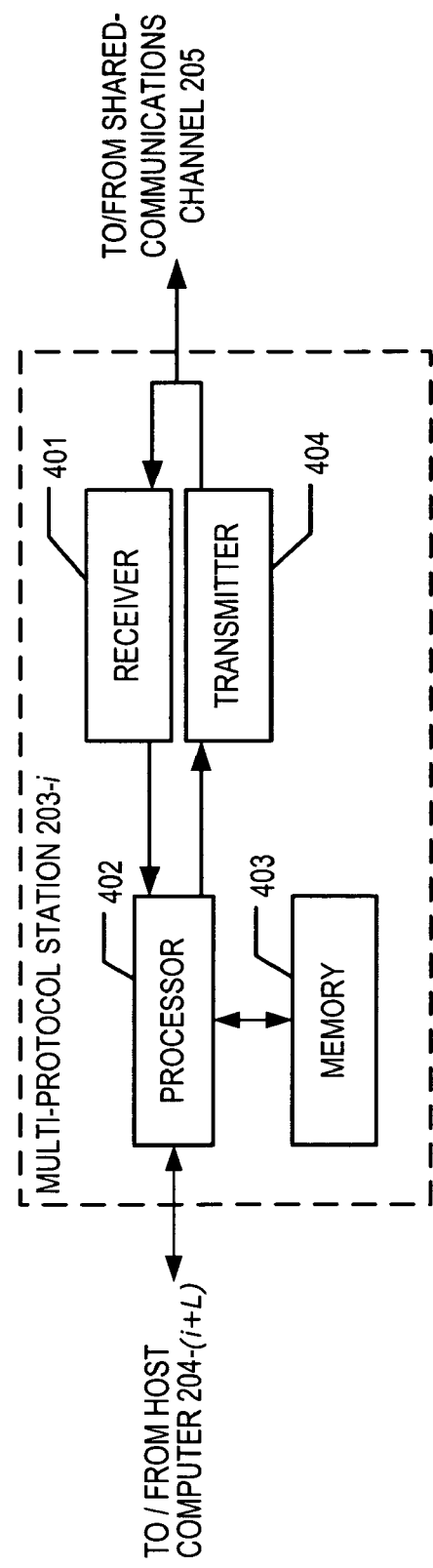
FIG. 4 depicts a block diagram of the salient components of multi-protocol station 203-$i$ in accordance with the illustrative embodiment of the present invention.

FIG. 4 depicts a block diagram of the salient components of multi-protocol station 203-*i* in accordance with the illustrative embodiment of the present invention. Multi-protocol station 203-*i* comprises receiver 401-*i*, processor 402-*i*, memory 403-*i*, and transmitter 404-*i*, interconnected as shown.

Receiver 401-*i* is a circuit that is capable of receiving messages from shared-communications channel 205, in well-known fashion, and of forwarding them to processor 402-*i*. It will be clear to those skilled in the art how to make and use receiver 401-*i*.

Processor 402-*i* is a general-purpose processor that is capable of performing the tasks described below and with respect to FIGS. 5, 6, and 8. It will be clear to those skilled in the art, after reading this specification, how to make and use processor 402-*i*.

Memory 403-*i* is capable of storing programs and data used by processor 402-*i*. It will be clear to those skilled in the art how to make and use memory 403-*i*.

Transmitter 404-*i* is a circuit that is capable of receiving messages from processor 402-*i*, in well-known fashion, and of transmitting them on shared-communications channel 205. It will be clear to those skilled in the art how to make and use transmitter 404-*i*.

Multi-protocol station 203-*i* comprises a single receiver/transmitter pair, in accordance with the illustrative embodiment of the present invention. Receiver 401-*i* and transmitter 404-*i* are each capable of communicating in accordance with both the IEEE 802.11 protocol and the Bluetooth protocol. In other embodiments, multi-protocol station 203-*i* comprises multiple receiver/transmitter pairs, where each pair handles a specific protocol (e.g., IEEE 802.11, Bluetooth, etc.).

FIG. 5 depicts an exemplary encoding of timing information, in accordance with the illustrative embodiment of the present invention. Multi-protocol station 203-*i* includes information group 500 in at least some of the frames transmitted to access point 201. These frames encoded with timing information provide access point 201 with information that indicates, or allows access point 201 to determine, those times when multi-protocol station 203-*i* is to transmit Bluetooth packets.

The first parameter that information group 500 specifies is at least a portion of a timing synchronization function (TSF) value, as is known in the art. The timing synchronization function is used to indicate that access point 201 is the intended recipient of the frame to be transmitted, in accordance with the illustrative embodiment. If multiple access points are present in network 200, it is unlikely that two or more access points would have the same timing synchronization function value. The value comprises a portion (e.g., the least significant 10 bits, etc.) of access point 201's latest timing synchronization function value, which had been broadcast previously as part of one of a series of regularly-broadcast beacon frames. It will be clear to those skilled in the art, after reading this specification, how to encode information as part of information group 500 to indicate an intended recipient.

The second parameter that information group 500 specifies is the synchronous connection oriented packet type that multi-protocol station 203-*i* transmits when transmitting in Bluetooth mode. The packet type is specified in the "type" field (e.g., two bits, etc.). Specifying the packet type also implicitly establishes the duration of each Bluetooth packet and the interval between successive Bluetooth transmissions. For example, if the High-Quality Voice 3 packets are to be transmitted, as indicated by the corresponding setting in the type field, the applicable duration is 625 microseconds and the applicable interval is 3.75 milliseconds.

The third parameter that information group 500 specifies is the offset of the next Bluetooth transmission (e.g., High-Quality Voice 3 packet, etc.) by using a pre-determined number of bits (e.g., four bits, etc.) When access point 201 receives a frame that contains information group 500, it calculates the transmission start time of the next Bluetooth packet based on the time it detects an edge (e.g., leading edge, trailing edge, etc.) of the conveying frame plus the offset. In some embodiments, access point 201 also factors in an adjustment to allow for propagation and processing delays.

Other parameters can also be encoded into information group 500. Some examples of parameters contained in the "other" field in FIG. 5 include (i) the particular function being invoked, (ii) the organizationally unique identifier (OUI), and (iii) spare bits. It will be clear to those skilled in the art, after reading this specification, what other parameters can be transmitted in the conveying frame.

Information group 500 is an example of what is sometimes referred to an info-address format. The info-address, as well as the organizationally unique identifier introduced earlier, is described in U.S. patent application Ser. No. 10/830570.

Figure 6:
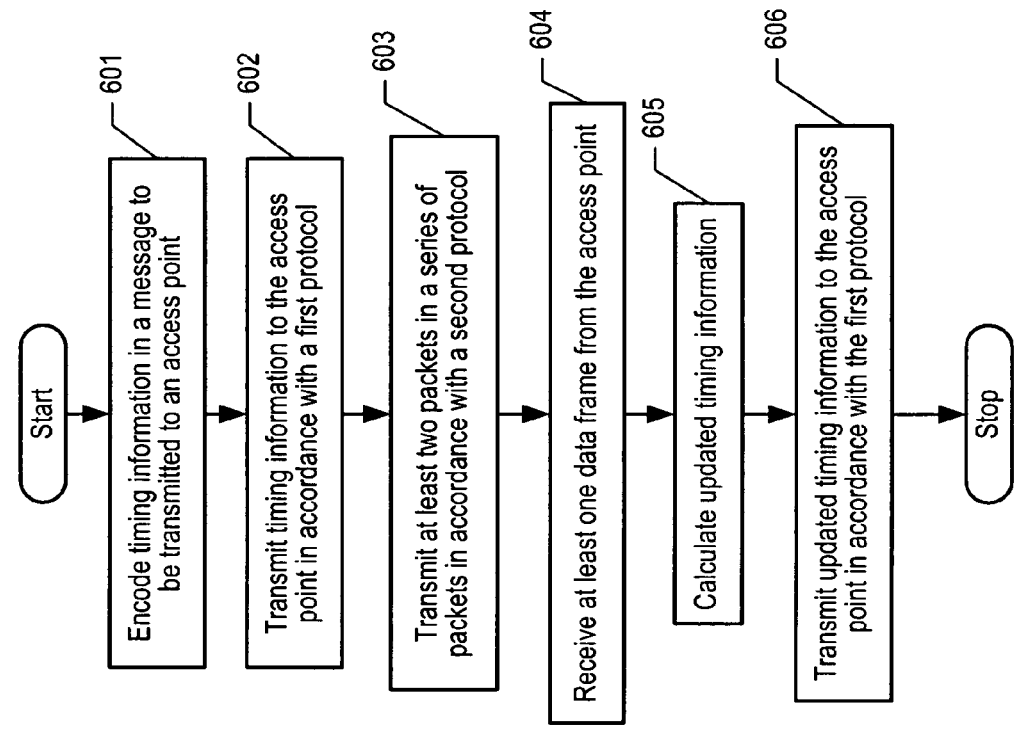
FIG. 6 depicts a flowchart of the salient tasks performed by multi-protocol station 203-$i$ in accordance with the illustrative embodiment of the present invention.

FIG. 6 depicts a flowchart of the salient tasks performed by multi-protocol station 203-*i* in accordance with the illustrative embodiment of the present invention. Multi-protocol station 203-1, used as an example, supports the IEEE 802.11 and Bluetooth protocols. That which is referred to as the "first protocol" is IEEE 802.11 and as the "second protocol" is Bluetooth.

As part of the salient tasks depicted, multi-protocol station 203-1 conveys timing information to access point 201. The timing information conveyed describes the characteristics of the Bluetooth packet or packets that are to be transmitted by multi-protocol station 203-1. Those characteristics can comprise some or all of the following:

i. duration of each packet transmission
  ii. start time of the next packet transmission
  iii. interval between successive packet transmissions
  iv. number of packet transmissions in the series.

The timing information conveyed to access point 201 provides enough information about the Bluetooth packet activity so that access point 201 can predict when each Bluetooth transmission occurs, allowing for permissible deviation from the time predicted. Access point 201 can be informed ahead of time with some of the timing information, depending on the application present in network 200. For example, if the Bluetooth application only involves High-Quality Voice 3 (HV3) packets, access point 201 can be pre-programmed with the duration of each packet transmission equal to 625 microseconds. In this case, the duration of each packet transmission would not have to be conveyed as part of the timing information transmitted by multi-protocol station 203-1 to access point 201 in the course of ongoing communications. It will be clear to those skilled in the art how to determine which timing characteristics of the Bluetooth packets can be provided to access point 201 initially (e.g., through programming, etc.) and which characteristics need to be transmitted by an IEEE 802.11 frame during ongoing communications via shared-communications channel 205.

At task 601, multi-protocol station 203-1 encodes the timing information in the form of an info-address value, as described for FIG. 6, in accordance with the illustrative embodiment of the present invention. Multi-protocol station 203-1 stores the info-address value in an address field of a frame used to convey the timing information.

At task 602, multi-protocol station 203-1 transmits the timing information to access point 201 in accordance with the IEEE 802.11 protocol. Multi-protocol 203-1 conveys the timing information in a transmitted frame. In some embodiments, multi-protocol 203-1 uses a null data frame, as is known in the art, to convey the timing information. In other embodiments, multi-protocol 203-1 uses a clear_to_send control frame, as is known in the art, to convey the timing information. It will be clear to those skilled in the art, after reading this specification, how to select and transmit a frame to convey the timing information.

At task 603, multi-protocol station 203-1 transmits at least two packets (e.g., synchronization connection oriented, etc.) in a series of packets. Multi-protocol station 203-1 transmits the packets in accordance with the Bluetooth protocol in well-known fashion. The series of packets is periodic, in some embodiments.

At task 604, multi-protocol station 203-1 receives at least one IEEE 802.11 data frame from access point 201 in well-known fashion.

At task 605, multi-protocol station 203-1 calculates updated timing information to transmit to access point 201. In accordance with the illustrative embodiment, multi-protocol station 203-1 bases the calculation on (i) the IEEE 802.11 frame received from access point 201 and (ii) at least one of the Bluetooth packets transmitted. For example, multi-protocol station 203-1 determines the arrival time of the IEEE 802.11 frame and the transmit time of at least one of the two Bluetooth packets on either side of the frame. Multi-protocol station 203-1 then determines how closely spaced the frame is to at least one of the two packets and updates the offset value in information group 500, relative to when the updated timing information is to be transmitted to access point 201. Calculating updated timing information is important to ensure that access point 201 does not start to interfere with the ongoing Bluetooth packet transmissions.

At task 606, multi-protocol station 203-1 transmits the updated timing information to access point 201 in accordance with the IEEE 802.11 protocol. In some embodiments, multi-protocol station 203-1 transmits the updated timing information only if the difference in time between (i) the IEEE 802.11 frame was received at task 604 and (ii) the Bluetooth packet was transmitted at task 603 exceeds a threshold value (e.g., 300 microseconds, etc.). This is important to minimize the number of timing information transmissions required and, therefore, to minimize the utilization of shared-communications channel 205.

Multi-protocol station 203-1 can transmit updated timing information for reasons other than correcting the timing of access point 201. For example, if the Bluetooth packet transmissions are not periodic, multi-protocol station 203-1 can transmit timing information when needed to indicate when the next set of Bluetooth packets are to be transmitted.

Figure 7:
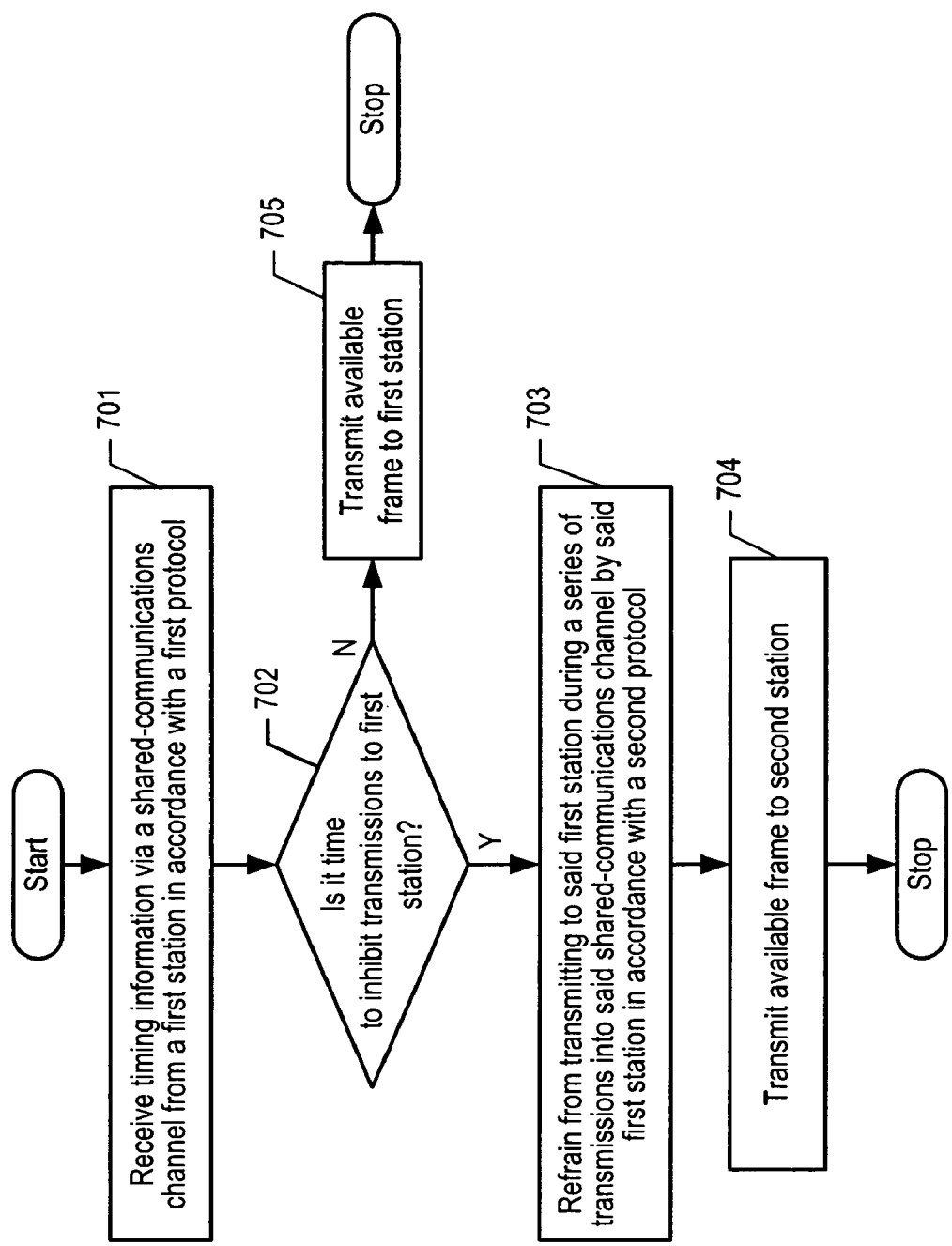
FIG. 7 depicts a flowchart of the salient tasks performed by access point 201 in accordance with the illustrative embodiment of the present invention.

FIG. 7 depicts a flowchart of the salient tasks performed by access point 201 in accordance with the first illustrative embodiment of the present invention. Multi-protocol station 203-1, also used as an example, supports the IEEE 802.11 and Bluetooth protocols. That which is referred to as the "first protocol" is IEEE 802.11 and as the "second protocol" is Bluetooth.

At task 701, access point 201 receives timing information via shared-communications channel 205 from multi-protocol station 203-1, and decodes the timing information. Access point 201 receives the timing information in a frame that has been transmitted, as depicted in FIG. 6 and in accordance with IEEE 802.11, by multi-protocol station 203-1. The timing information is in the format as depicted in FIG. 5. In accordance with the illustrative embodiment of the present invention, access point 201 reads information group 500 contained in the received frame. As a result of reading the timing synchronization function value that constitutes information group 500, access point 201 determines that it is indeed the intended recipient of the message. It will be clear to those skilled in the art how to receive and decode information contained in a frame.

At task 702, access point 201 determines if it is time to refrain from transmitting to multi-protocol station 203-1. It determines this based on the decoded timing information from information group 500-specifically, (i) the type of Bluetooth packets and (ii) the offset value of the next packet. Based on (i) the time at which access point 201 receives the IEEE 802.11 frame at task 701 and on (ii) the offset value relative to the receive time of the frame, access point 201 determines when the next Bluetooth packet is to be transmitted by multi-protocol station 203-1. Access point 201 also knows when successive packets are to be transmitted by multi-protocol station 203-1, as well as the duration of each packet transmission, based on the type information that constitutes information group 500.

In some embodiments, access point 201 assumes that the Bluetooth packets are transmitted periodically, unless the timing information received and decoded indicates otherwise.

At task 703, if a Bluetooth packet is in the process of being transmitted by multi-protocol station 203-1, access point 201 refrains from transmitting any available frames to multi-protocol station 203-1. Access point 201 tracks Bluetooth packet transmissions by using the timing information received.

At task 704, access point 201 transmits an available frame to (single-protocol) station 202-2 or to another station (i.e., a single-protocol or multi-protocol station) that is not scheduled to transmit a Bluetooth packet at that moment.

At task 705, access point 201 transmits an available frame to multi-protocol station 203-1 only if a Bluetooth packet is not scheduled to be transmitted by multi-protocol station 203-1.

Figure 8:
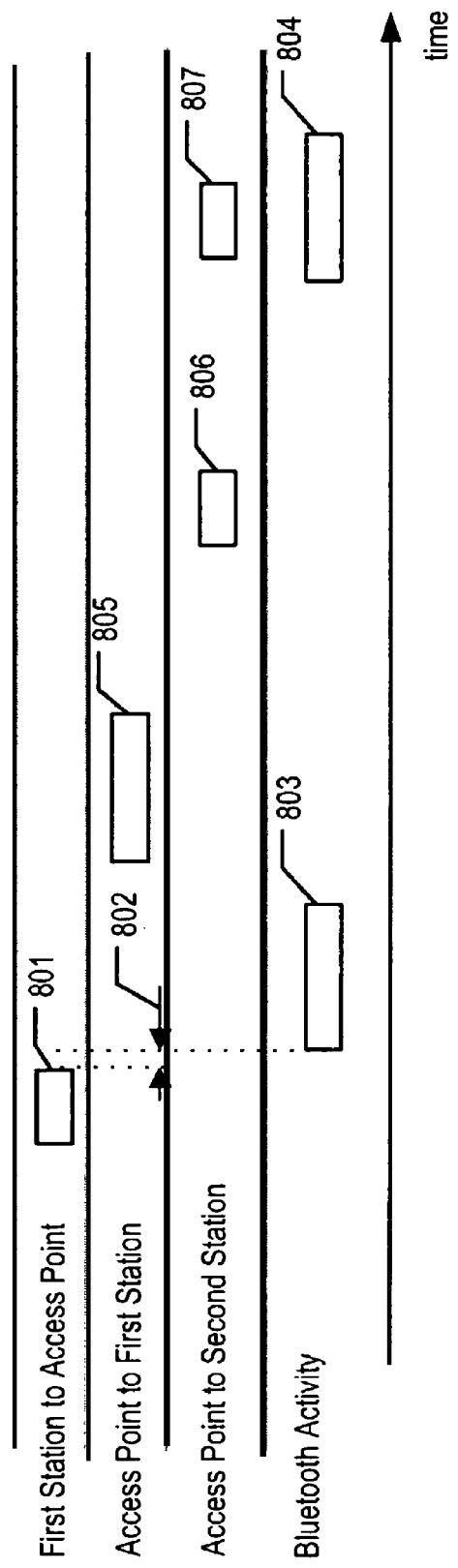
FIG. 8 depicts a sequence of messages exchanged in accordance with the illustrative embodiment of the present invention.

FIG. 8 depicts a sequence of messages (e.g., frames, packets, etc.) in accordance with the illustrative embodiment of the present invention. Multi-protocol station 203-1, used in the example (i.e., "first station"), supports the IEEE 802.11 and Bluetooth protocols. The Bluetooth part of multi-protocol station 203-1 has to transmit High Quality Voice 3 (HV3) packets (e.g., packet 803, packet 804, etc.) every 3.75 milliseconds with each packet being 625 microseconds in length.

Multi-protocol station 203-1 transmits IEEE 802.11 frame 801 to access point 201 via shared-communications channel 205, in accordance with the illustrative embodiment of the present invention. Frame 801 contains a timing value for offset 802 that indicates the time until the start of the next Bluetooth packet in a series of packets, as measured from the trailing edge of frame 801. As will be appreciated by those skilled in the art, in some embodiments the timing value might instead indicate the time until the start of the next Bluetooth packet, as measured from the leading edge of frame 801.

Multi-protocol station 203-1 transmits Bluetooth packet 803 into shared-communications channel 205, in well-known fashion. Packet 803 is one in a series of Bluetooth packets that also includes Bluetooth packet 804.

Meanwhile, access point 201 has IEEE 802.11 frame 805 available to transmit to multi-protocol station 203-1. Access point 201, however, refrains from transmitting until the determined transmit interval of Bluetooth packet 803 has elapsed. Access point 201 then transmits frame 805 into shared-communications channel 205 to multi-protocol station 203-1.

Access point 201 also transmits IEEE 802.11 frames to other stations (e.g., multi-protocol station 203-2, station 202-1, etc.) via shared-communications channel 205. For example, access point 201 transmits IEEE 802.11 frame 806 to multi-protocol station 203-2, provided that multi-protocol station 203-2 is not transmitting a Bluetooth packet at that moment.

In some embodiments, access point 201 might be allowed to transmit IEEE 802.11 frames to stations other than multi-protocol station 203-1 during the transmission of Bluetooth packet 804. Access point 201 consequently transmits frame 807 to station 202-1.

In some other embodiments, access point 201 is not allowed to use shared-communications channel 205 to communicate with any station during a Bluetooth packet transmission and does not transmit during a Bluetooth packet transmission.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving at an access point a timing information frame from a first telecommunications station via a shared-communications channel in accordance with a first protocol, wherein the timing information frame comprises timing information, and wherein the timing information indicates a future transmit time of at least a first of a series of transmissions that the first telecommunications station will transmit into the shared-communications channel in accordance with a second protocol that is not understood by the access point;
   the access point refraining from transmitting to the first telecommunications station in accordance with the first protocol during each transmission of the series of transmissions indicated by the timing information;
   transmitting a data frame from the access point to the first telecommunications station via the shared-communications channel in accordance with the first protocol between the transmit times of consecutive packets in the series of packets by the first telecommunications station; and
   receiving, by the access point, updated timing information via the shared-communications channel in accordance with the first protocol, wherein the updated timing information is based at least in part on: (a) the data frame transmitted from the access point, and (b) the series of transmissions.

2. The method of claim 1, further comprising the access point transmitting a data frame in accordance with the first protocol to a second telecommunications station via the shared-communications channel, wherein the first telecommunications station and the second telecommunications station are separate.

3. The method of claim 2, wherein the transmitting of the data frame by the access point to the second telecommunications station overlaps a transmission in the series of transmissions into the shared-communications channel indicated by the timing information.

4. The method of claim 1, wherein the timing information frame is a null data frame.

5. The method of claim 4, wherein an address field in the null data frame conveys the timing information.

6. The method of claim 1, wherein the series of transmissions are periodic transmissions.

7. The method of claim 1, wherein the first protocol is an IEEE 802.11 protocol and the second protocol is a Bluetooth protocol.

8. The method of claim 1, wherein each transmission in the series of transmissions is a Bluetooth synchronous connection oriented packet.

9. The method of claim 1, wherein the timing information frame further includes an indication of the type of packet the first telecommunications station will transmit in the series of transmissions, the access point utilizing the type indication to determine a duration of each transmission and an interval between transmissions.

10. The method of claim 1, wherein the timing information frame further indicates the number of transmissions in the series of transmissions that the first telecommunications station will transmit into the shared-telecommunications channel in accordance with the second protocol.

11. The method of claim 1, further comprising the access point transmitting one or more data frames to the first telecommunications station in accordance with the first protocol outside of the transmit times indicated in the timing information.

12. The method of claim 1, wherein the timing information indicates a schedule setting forth the number of packets the first telecommunications station will transmit into the shared-communications channel in accordance with the second protocol, a start time of a first packet of the series, and an interval between packets in the series.

13. A method comprising:
   a first telecommunications station transmitting a timing information frame via a shared-communications channel to an access point in accordance with a first protocol, wherein the timing information frame includes timing information within the frame, and the timing information indicates a future transmit time of at least a first packet of a series of packets that the first telecommunications station will transmit into the shared-communications channel in accordance with a second protocol;

the first telecommunications station transmitting the series of packets via the shared-communications channel in accordance with a second protocol to a second telecommunications device;

the first telecommunications station receiving a data frame from the access point via the shared-communications channel in accordance with the first protocol, wherein the receiving of the data frame occurs between the transmit times of consecutive packets in the series of packets by the first telecommunications station; and the first telecommunications station transmitting updated timing information via the shared-communications channel to the access point in accordance with the first protocol, wherein the updated timing information is based at least in part on: (a) the receiving of the data frame from the access point, and (b) the transmitting of a packet in the series of packets:

wherein the first protocol and the second protocol are different, and the second protocol is not understood by the access point.

14. The method of claim 13, wherein the timing information frame is a null data frame, and the method further comprising encoding the timing information into an address field of the null data frame.

15. The method of claim 13, wherein the transmit times of the packets that constitute the series of packets are substantially periodic.

16. The method of claim 13, wherein the first protocol is an IEEE 802.11 protocol and the second protocol is a Bluetooth protocol.

17. The method of claim 13, wherein the series of packets comprises Bluetooth synchronous connection oriented packets.

18. The method of claim 13, wherein the timing information frame further includes an indication of the type of packet the first telecommunications station will transmit in the series of transmissions, the type of packet being associated with a pre-determined duration of each packet transmission and a corresponding interval between packet transmissions.

19. The method of method 13, wherein the timing information frame further indicates the number of transmissions in the series of transmissions that the first telecommunications station will transmit into the shared-telecommunications channel in accordance with the second protocol.

20. An apparatus comprising:
a processor; and
a memory, wherein the memory comprises instructions stored thereon that when executed by the processor cause the apparatus to:
transmit timing information within a timing information frame via a shared-communications channel to an access point in accordance with a first protocol, the timing information indicating a future transmit time of at least a first of a series of packets that will be transmitted into a shared-communications channel in accordance with a second protocol;
transmit the series of packets via the shared-communications channel in accordance with the second protocol;
receive a data frame from the access point via the shared-communications channel in accordance with the first protocol, wherein the data frame is received between transmit times of consecutive packets in the series of packets; and
transmit updated timing information via the shared-communications channel to the access point in accordance with the first protocol, wherein the updated timing information is based at least in part on: (a) the data frame received from the access point and (b) a packet in the series of packets, wherein the first protocol and the second protocol are different, and the second protocol is not understood by the access point.

21. The apparatus of claim 20, wherein (i) the timing information frame is a null data frame, and (ii) the timing information is encoded into an address field of the null data frame.

22. The apparatus of claim 20, wherein (i) the first protocol is an IEEE 802.11 protocol, (ii) the second protocol is a Bluetooth protocol, and (iii) the series of packets comprises Bluetooth synchronous connection oriented packets.

23. The apparatus of claim 20, wherein the timing information frame further includes an indication of the type of packet the first telecommunications station will transmit in the series of transmissions, the type of packet being associated with a pre-determined duration of each packet transmission and a corresponding interval between packet transmissions.

24. The apparatus of claim 20, wherein the timing information frame further indicates the number of transmissions in the series of transmissions that will be transmitted into the shared-telecommunications channel in accordance with the second protocol.

25. An apparatus comprising:
a receiver;
a transmitter;
a processor; and
a memory, wherein the memory comprises instructions stored thereon that when executed by the processor cause the apparatus to:
receive a timing information frame via the receiver comprising timing information from a first telecommunications station via a shared-communications channel in accordance with a first protocol;
refrain from transmitting to the first telecommunications station in accordance with the first protocol during each transmission of the series of transmissions indicated by the timing information;
transmit a data frame to the first telecommunications station via the shared-communications channel in accordance with the first protocol between the transmit times of consecutive packets in the series of packets by the first telecommunications station; and
receive updated timing information via the shared-communications channel in accordance with the first protocol, wherein the updated timing information is based at least in part on: (a) the data frame transmitted from the access point, and (b) a packet in the series of packets,
wherein the timing information indicates a future transmit time of at least a first of a series of transmissions that the first telecommunications station will transmit into the shared-communications channel in accordance with a second protocol that is not understood by the apparatus.

26. The apparatus of claim 25, wherein the timing information frame further includes an indication of the type of packet the first telecommunications station will transmit in the series of transmissions, and wherein the type indication is utilized to determine a duration of each transmission and an interval between transmissions.

27. The apparatus of claim 25, wherein the timing information frame further indicates the number of transmissions in the series of transmissions that the first telecommunications station will transmit into the shared-telecommunications channel in accordance with the second protocol.

28. The apparatus of claim 25, wherein the memory comprises further instructions stored thereon that when executed by the processor cause the transmitter to transmit one or more data frames to the first telecommunications station in accordance with the first protocol outside of the transmit times indicated in the timing information.

29. The apparatus of claim 25, wherein the timing information indicates a schedule setting forth the number of packets the first telecommunications station will transmit into the shared-communications channel in accordance with the second protocol, a start time of a first packet of the series, and an interval between packets in the series.

* * * * *

UNITED STATES PATENT AND TRADEMARK OFFICE
CERTIFICATE OF CORRECTION

PATENT NO. : 8,107,882 B2  
APPLICATION NO. : 10/861065  
DATED : January 31, 2012  
INVENTOR(S) : Fischer et al.

Page 1 of 1

It is certified that error appears in the above-identified patent and that said Letters Patent is hereby corrected as shown below:

Column 1, line 17, delete "Network,"." and insert -- Network". --.

Column 11, line 17, in Claim 13, delete "packets:" and insert -- packets; --.

Column 11, line 40, in Claim 19, delete "The method of method 13," and insert -- The method of claim 13, --.

Signed and Sealed this  
Thirty-first Day of July, 2012

David J. Kappos  
*Director of the United States Patent and Trademark Office*